(12) United States Patent
Shen et al.

(10) Patent No.: US 7,999,959 B2
(45) Date of Patent: Aug. 16, 2011

(54) SYSTEM AND METHOD FOR USER-SPECIFIC DISCOVERY AND INITIATION OF A DEFAULT DOCUMENT PROCESSING DEVICE

(75) Inventors: Ming-Teh Shen, Irvine, CA (US); Sheng W. Lee, Irvine, CA (US); William Su, Riverside, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 806 days.

(21) Appl. No.: 12/060,374

(22) Filed: Apr. 1, 2008

(65) Prior Publication Data

US 2009/0244598 A1 Oct. 1, 2009

(51) Int. Cl.
*G06F 3/12* (2006.01)
*G06K 15/00* (2006.01)
(52) U.S. Cl. ..................... 358/1.15; 358/1.18
(58) Field of Classification Search ............. 358/1.15, 358/1.18, 448, 443, 405, 406, 408
See application file for complete search history.

(56) References Cited

U.S. PATENT DOCUMENTS

| | | | |
|---|---|---|---|
| 6,241,404 B1 * | 6/2001 | Fietze et al. | 400/76 |
| 2007/0198714 A1 * | 8/2007 | Faden | 709/225 |
| 2008/0021907 A1 * | 1/2008 | Patel et al. | 707/10 |

* cited by examiner

*Primary Examiner* — Jerome Grant, II
(74) *Attorney, Agent, or Firm* — SoCal IP Law Group LLP; Steven C. Sereboff; Jonathan Pearce (57) ABSTRACT

The subject application is directed to a system and method for user-specific discovery and initiation of a default document processing device. First, a computing device is placed in data communication with an associated data network. Device data corresponding to document processing devices accessible by the computing device is then retrieved. Via the associated data network, data communication is established between the computing device and the document processing devices. The relative location between the computing device and each of the document processing devices is then determined according to the established data communication. A default document processing device subset is thereafter selected from the available document processing devices based upon the determined location. Operation of the document processing device subset is then enabled via the computing device.

12 Claims, 6 Drawing Sheets

SYSTEM AND METHOD FOR USER-SPECIFIC DISCOVERY AND INITIATION OF A DEFAULT DOCUMENT PROCESSING DEVICE

BACKGROUND OF THE INVENTION

The subject application is directed generally to selection of one or more available networked document processing devices from a list of available devices. The application is particularly applicable to automatically identifying and installing of an optimal default printing device for individual computer users.

Many businesses employ a large number of shared document processing devices, such as printers, copiers, scanners, and facsimile devices, as well as devices having more than one of such functions, referred to as multifunction peripherals or MFPs. The document processing devices are accessible to users via their computing devices, such as desktop computers, portable computers, personal digital assistants (PDAs), smart phones, or the like. Connection between the computing devices is typically completed via a data network, such as a local area network (LAN), a wide area network (WAN), or a hybridized network having both local and remote segments. Data interchange in such networks is suitably accomplished via a wired data connection, such as Ethernet or token ring, or any suitable wired data transmission system; wirelessly via WiFi, WiMax, or any suitable wireless data transmission system; or through a hybridized network employing wired and wireless data transmission capability.

Many enterprises have a large number of document processing devices available for use. Users will typically have a default device assigned for use. Then, commencing an operation, such as a print operation from an application running on a computer, would result in a printout of a document on a default printer. Default devices are typically chosen as those more physically proximate to a computing device or those relatively proximate devices which have requisite capabilities, such as an ability to print in color.

When a computing device is initiated, a listing of all available printers may be displayed. By way of example, this function may be accomplished via a service location protocol (SLP), such as that set forth in the standards RFC 2608, which is incorporated herein by reference. When there are many available document processing devices, it is difficult to determine which one may be in a best relative location, which devices are functional and which devices have needed capabilities. These problems are exacerbated further given the mobile nature of many users or computing devices. There are frequent occurrences where a location from which a computing device will be operated is changed, either temporarily or indefinitely. A user may move to a different part of a floor, a different floor of a building, a different building or a different geographical location. Such movement requires again identifying, selection and installation of one or more default document processing devices.

SUMMARY OF THE INVENTION

In accordance with one embodiment of the subject application, there is provided a system and method for the selection of one or more available networked document processing devices from a list of available devices.

Further, in accordance with one embodiment of the subject application, there is provided a system and method for automatically identifying and installing of an optimal default printing device for individual computer users.

Still further, in accordance with one embodiment of the subject application, there is provided a system for user-specific discovery and initiation of a default document processing device. The system includes means adapted for placing a computing device in data communication with an associated data network and means adapted for retrieving device data corresponding to a plurality of document processing devices accessible by the computing device. The system also includes means adapted for establishing data communication between the computing device and the plurality of document processing devices via the associated data network and locating means adapted for determining a relative location between the computing device and each of the plurality of document processing devices in accordance with established data communication. The system further comprises selection means adapted for selecting a default document processing device subset from the plurality thereof in accordance with an output of the locating means and enabling means adapted for enabling operation of the document processing device subset via the computing device.

In one embodiment of the subject application, the selection means includes means adapted for selecting the default document processing device subset as being that local to a location of the computing device.

In another embodiment of the subject application, the locating means includes means adapted for determining relative location in accordance with a trace route operation identifying a data path between the computing device and each of the plurality of document processing devices.

In a further embodiment of the subject application, the selection means includes means adapted for selecting the default document processing device subset inclusive of a default document processing device. In such an embodiment, the system further includes means adapted for installing a driver in the computing device corresponding to a selected default document processing device.

In yet another embodiment of the subject application, the system includes testing means adapted for determining availability of the default document processing device and means adapted for selecting a second document processing device as the default document processing device in accordance with an output of the testing means. The system further includes means adapted for installing a driver in the computing device corresponding to the second document processing device.

In another embodiment of the subject application, the system also comprises notification means adapted for generating a notification to an associated user relative to selection of a default document processing device.

Still further, in accordance with one embodiment of the subject application, there is provided a method for user-specific discovery and initiation of a default document processing device in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for user-specific discovery and initiation of a default document processing device. In particular, the subject application is directed to a system and method for selection of one or more available networked document processing devices from a list of available devices. More particularly, the subject application is directed to a system and method for automatically identifying and installing an optimal default printing device for individual computer users. It will become apparent to those skilled in the art that the system and method described herein are suitably adapted to a plurality of varying electronic fields employing networked devices, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
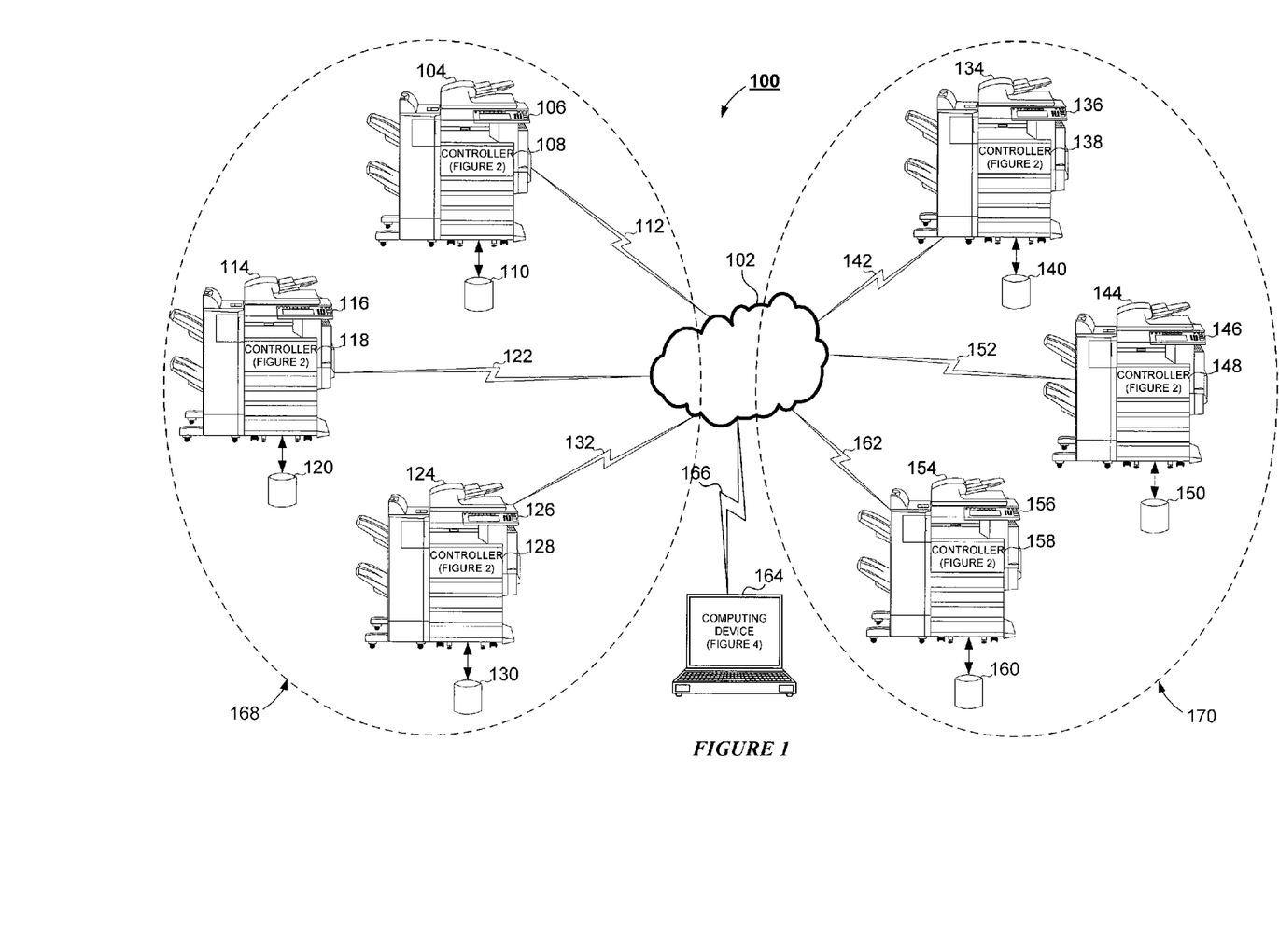
FIG. 1 is an overall diagram of a system for user-specific discovery and initiation of a default document processing device according to one embodiment of the subject application.

Referring now to FIG. 1, there is shown an overall diagram of a system 100 for user-specific discovery and initiation of a default document processing device in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11 (x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a plurality of document processing devices 104, 114, 124, 134, 144, and 154, depicted in FIG. 1 as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing devices 104, 114, 124, 134, 144, and 154 are suitably adapted to provide remote document processing services to external or network devices. Preferably, the document processing devices 104, 114, 124, 134, 144, and 154 include hardware, software, and any suitable combination thereof, configured to interact with an associated user, a networked device, or the like.

According to one embodiment of the subject application, the document processing devices 104, 114, 124, 134, 144, and 154 are suitably equipped to receive a plurality of portable storage media, including, without limitation, Firewire drive, USB drive, SD, MMC, XD, Compact Flash, Memory Stick, and the like. In the preferred embodiment of the subject application, each of the document processing devices 104, 114, 124, 134, 144, and 154 further includes an associated user interface 106, 116, 126, 136, 146, and 156, such as a touch-screen, LCD display, touch-panel, alpha-numeric keypad, or the like, via which an associated user is able to interact directly with the corresponding document processing device 104, 114, 124, 134, 144, and 154. In accordance with the preferred embodiment of the subject application, the user interfaces 106, 116, 126, 136, 146, and 156 are advantageously used to communicate information to the associated user and receive selections from the associated user. The skilled artisan will appreciate that the user interfaces 106, 116, 126, 136, 146, and 156 comprise various components, suitably adapted to present data to the associated user, as are known in the art. In accordance with one embodiment of the subject application, each of the user interfaces 106, 116, 126, 136, 146, and 156 comprises a display, suitably adapted to display one or more graphical elements, text data, images, or the like, to an associated user, receive input from the associated user, and communicate the same to a backend component, such as a controller 108, 118, 128, 138, 148, and 158, as explained in greater detail below. Preferably, the document processing devices 104, 114, 124, 134, 144, and 154 are communicatively coupled to the computer network 102 via a suitable communications link 112, 122, 132, 142, 152, and 162, respectively. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, each of the document processing devices 104, 114, 124, 134, 144, and 154 further incorporates a backend component, designated as the controllers 108, 118, 128, 138, 148, and 158, suitably adapted to facilitate the operations of the associated document processing device 104, 114, 124, 134, 144, and 154, as will be understood by those skilled in the art. Preferably, the controllers 108, 118, 128, 138, 148, and 158 are embodied as hardware, software, or any suitable combination thereof, configured to control the operations of the associated document processing devices 104, 114, 124, 134, 144, and 154, facilitate the display of images via the user interfaces 106, 116, 126, 136, 146, and 156, direct the manipulation of electronic image data, and the like. For purposes of explanation, the controllers 108, 118, 128, 138, 148, and 158 are used to refer to any myriad of components associated with the document processing devices 104, 114, 124, 134, 144, and 154, including hardware, software, or combinations thereof, functioning to perform, cause to be performed, control, or otherwise direct the methodologies described hereinafter. It will be understood by those skilled in the art that the methodologies described with respect to the controllers 108, 118, 128, 138, 148, and 158 are capable of being performed by any general purpose computing systems, known in the art, and thus the controllers 108, 118, 128, 138, 148, and 158 are representative of such general computing devices and are intended as such when used hereinafter. Furthermore, the use of the controllers 108, 118, 128, 138, 148, and 158 hereinafter is for the example embodiment only, and other embodiments, which will be apparent to one skilled in the art, are capable of employing the system and method for user-specific discovery and initiation of a default document processing device of the subject application. The functioning of the controllers 108, 118, 128, 138, 148, and 158 will better be understood in conjunction with the block diagrams illustrated in FIGS. 2 and 3, explained in greater detail below.

Communicatively coupled to the document processing devices 104, 114, 124, 134, 144, and 154 are data storage devices 110, 120, 130, 140, and 150. In accordance with the preferred embodiment of the subject application, the data storage devices 110, 120, 130, 140, and 150 are any mass storage devices known in the art including, for example and without limitation, magnetic storage drives, a hard disk drive, optical storage devices, flash memory devices, or any suitable combination thereof. In the preferred embodiment, the data storage devices 110, 120, 130, 140, and 150 are suitably adapted to store document data, image data, electronic database data, or the like. It will be appreciated by those skilled in the art that while illustrated in FIG. 1 as being separate components of the system 100, the data storage devices 110, 120, 130, 140, and 150 are capable of being implemented as internal storage components of the document processing devices 104, 114, 124, 134, 144, and 154, components of the controller 108, 118, 128, 138, 148, and 158, or the like, such as, for example and without limitation, an internal hard disk drive, or the like.

The system 100 illustrated in FIG. 1 further depicts a computing device 164, in data communication with the computer network 102 via a communications link 166. It will be appreciated by those skilled in the art that the computing device 164 is shown in FIG. 1 as a laptop computer for illustration purposes only. As will be understood by those skilled in the art, the computing device 164 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 166 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the computing device 164 is suitably adapted to generate and transmit electronic documents, document processing instructions, user interface modifications, upgrades, updates, personalization data, or the like, to the document processing devices 104, 114, 124, 134, 144, and 154, or any other similar device coupled to the computer network 102. The functioning of the computing device 164 will better be understood in conjunction with the block diagram illustrated in FIG. 4, explained in greater detail below.

The system 100 further includes one or more subsets of document processing devices, shown in FIG. 1 as the first subset 168 comprising the document processing devices 104, 114, and 124, and the second subset 170 comprising the document processing devices 134, 144, and 154. It will be understood by those skilled in the art that the subsets 168 and 170 correspond to groupings of document processing devices, such as, for example and without limitation, separate physical locations, different offices, different departments, different groups of devices with each group having a predesignated function, different virtual locations, or the like. Thus, for example, the first subset 168 corresponds to an office in a first building or location and the second subset 170 corresponds to a different office in a second building or location. Another example includes the first subset 168 as a group of document processing devices associated with a first department of a company and the second subset 170 as a group of document processing devices associated with a second, different department of the same company, with the physical location between the two subsets 168 and 170 capable of being different floors of the same building, different portions of the same floor, the same physical location, different buildings, or the like. It will further be understood by those skilled in the art that the subsets 168 and 170 are capable of each including any number of associated document processing devices, e.g. each subset is capable of comprising a single document processing device, and the inclusion of multiple document processing devices 104, 114, 124, 134, 144, and 154 in the subsets 168 and 170 is for example purposes only.

Figure 2:
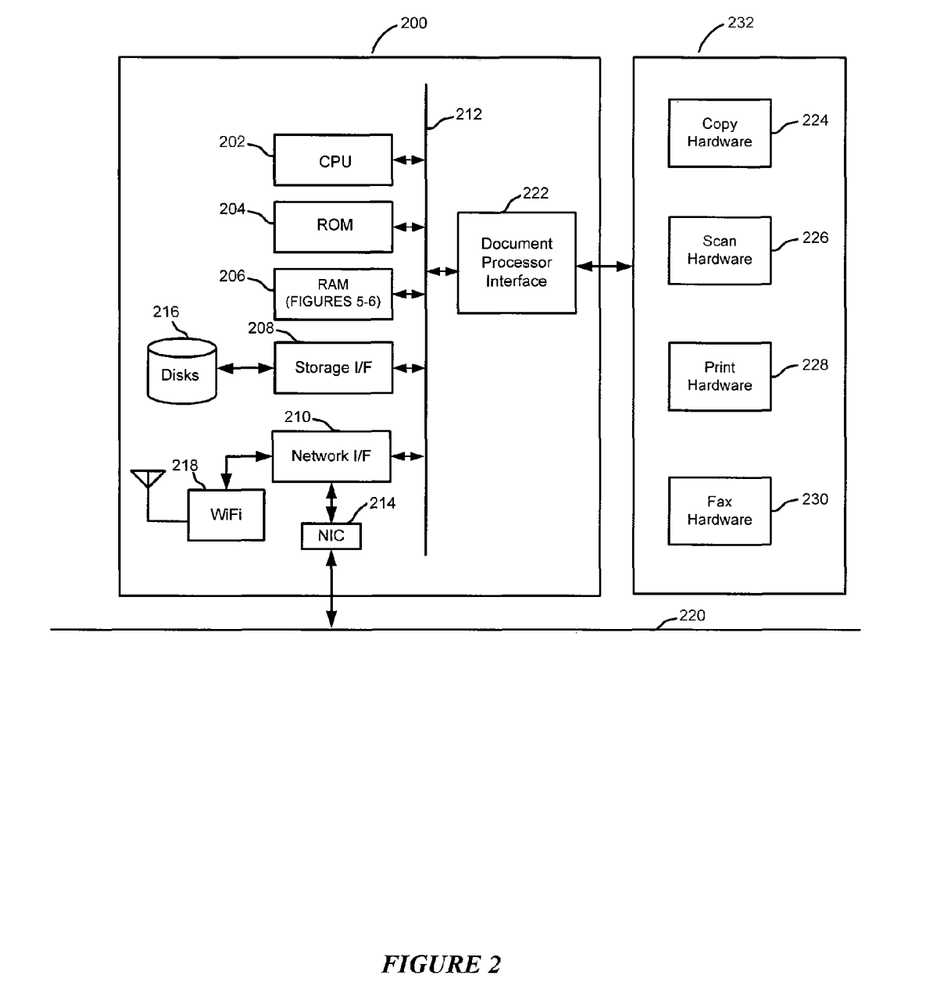
FIG. 2 is a block diagram illustrating controller hardware for use in the system for user-specific discovery and initiation of a default document processing device according to one embodiment of the subject application.

Turning now to FIG. 2, illustrated therein is a representative architecture of a suitable backend component, i.e. the controller 200, shown in FIG. 1 as the controllers 108, 118, 128, 138, 148, and 158, on which operations of the subject system 100 are completed. The skilled artisan will understand that the controller 200 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the controller 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208, and the network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
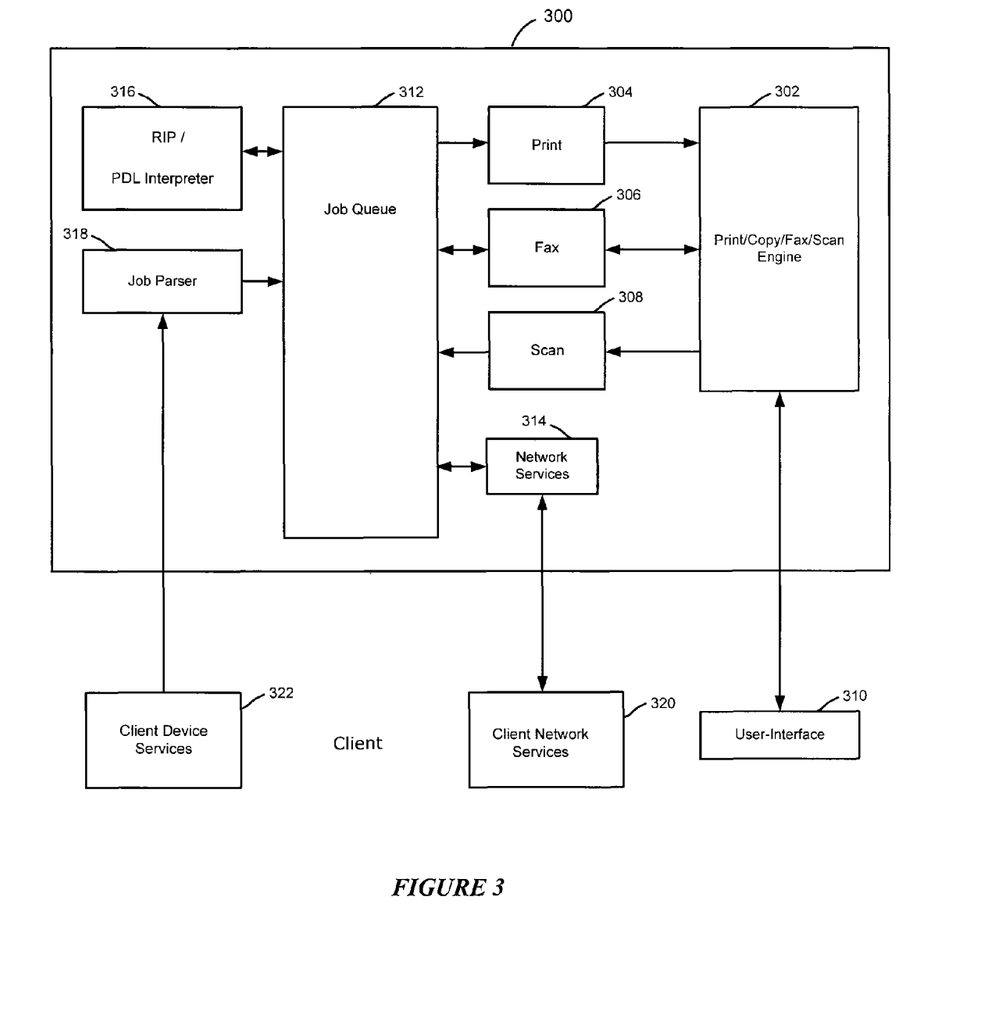
FIG. 3 is a functional diagram illustrating the controller for use in the system for user-specific discovery and initiation of a default document processing device according to one embodiment of the subject application.

Functionality of the subject system 100 is accomplished on a suitable document processing device, such as the document processing devices 104, 114, 124, 134, 144, and 154, which includes the controller 200 of FIG. 2, (shown in FIG. 1 as the controllers 108, 118, 128, 138, 148, and 158) as an intelligent subsystem associated with a document processing device. In the illustration of FIG. 3, controller function 300 in the preferred embodiment, includes a document processing engine 302. Suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image processor, page description language interpreter or any suitable mechanism for interchange of an electronic document to a format better suited for interchange with device functions such as print 304, facsimile 306, or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The parser 318 functions to interpret a received electronic document file and relay it to the job queue 312 for handling in connection with the afore-described functionality and components.

Figure 4:
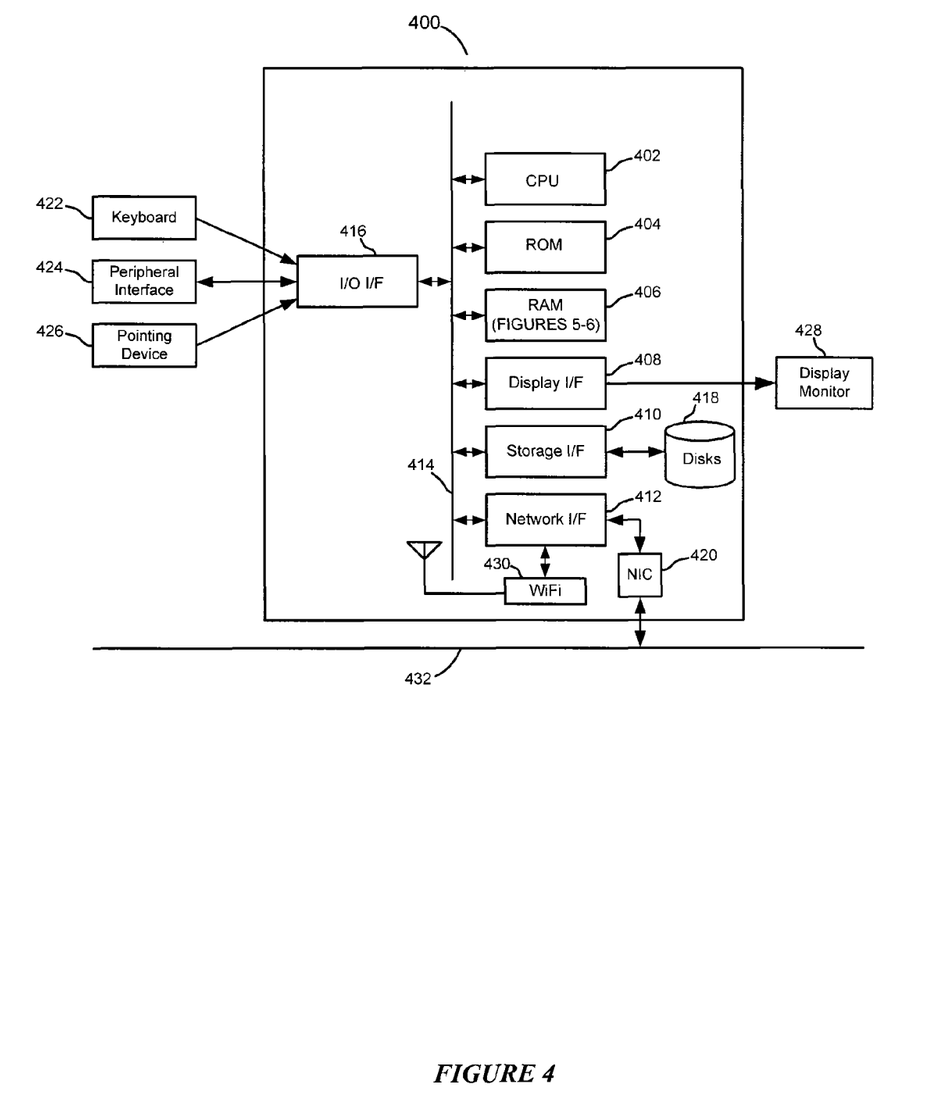
FIG. 4 is a functional diagram illustrating the computing device for use in the system for user-specific discovery and initiation of a default document processing device according to one embodiment of the subject application.

Turning now to FIG. 4, illustrated is a hardware diagram of a suitable computing device 400 for use in connection with the subject system. A suitable computing device includes a processor unit 402 which is advantageously placed in data communication with read only memory 404, suitably non-volatile read only memory, volatile read only memory or a combination thereof, random access memory 406, display interface 408, storage interface 410, and network interface 412. In a preferred embodiment, interface to the foregoing modules is suitably accomplished via a bus 414.

The read only memory 404 suitably includes firmware, such as static data or fixed instructions, such as BIOS, system functions, configuration data, and other routines used for operation of the computing device 400 via CPU 402.

The random access memory 406 provides a storage area for data and instructions associated with applications and data handling accomplished by the processor 402.

The display interface 408 receives data or instructions from other components on the bus 414, which data is specific to generating a display to facilitate a user interface. The display interface 408 suitably provides output to a display terminal 428, suitably a video display device such as a monitor, LCD, plasma, or any other suitable visual output device as will be appreciated by one of ordinary skill in the art.

The storage interface 410 suitably provides a mechanism for non-volatile, bulk or long term storage of data or instructions in the computing device 400. The storage interface 410 suitably uses a storage mechanism, such as storage 418, suitably comprised of a disk, tape, CD, DVD, or other relatively higher capacity addressable or serial storage medium.

The network interface 412 suitably communicates to at least one other network interface, shown as network interface card 420, such as a network interface card, and wireless network interface 430, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface card 420 is interconnected for data interchange via a physical network 432, suitably comprised of a local area network, wide area network, or a combination thereof.

An input/output interface 416 in data communication with the bus 414 is suitably connected with an input device 422, such as a keyboard or the like. The input/output interface 416 also suitably provides data output to a peripheral interface 424, such as a USB, universal serial bus output, SCSI, Firewire (IEEE 1394) output, or any other interface as may be appropriate for a selected application. Finally, the input/output interface 416 is suitably in data communication with a pointing device interface 426 for connection with devices, such as a mouse, light pen, touch screen, or the like In operation, a computing device is first placed in data communication with an associated data network. Device data is then retrieved corresponding to a plurality of document processing devices accessible by the computing device. Data communication is then established between the computing device and the plurality of document processing devices via the associated data network. The relative location between the computing device and each of the document processing devices is then determined in accordance with the established data communication. A default document processing device subset is thereafter selected from the available document processing devices in accordance with the determined location. Operation of the document processing device subset is then enabled via the computing device.

According to one example embodiment of the subject application, a computing device 164 is first placed in data communication with a data network, such as the network 102 illustrated in FIG. 1. The connection between the computing device 164 and the computer network 102 is accomplished via the communications link 166, whereupon the computing device 164 is in data communication with the network 102. The computing device 164 then retrieves data corresponding to those document processing devices 104, 114, 124, 134, 144, and 154 accessible to the computing device 164 via the network 102. Preferably the computing device 164 includes software, hardware, or a suitable combination thereof, capable of performing the methodologies described herein, e.g. an application, driver, utility, or other the like. In accordance with one embodiment of the subject application, the retrieval of such available device data is accomplished, for example and without limitation, via WINDOWS printer discovery, via an SNMP broadcast to each device 104, 114, 124, 134, 144, and 154 on the network 102, via use of service location protocol (SLP) operations, or the like.

Data communications are then established between the computing device 164 and each of the document processing devices 104, 114, 124, 134, 144, and 154 via the data network 102. A data path between the computing device 164 and each of the document processing devices 104, 114, 124, 134, 144, and 154 is then identified in accordance with a trace route operation. In accordance with one example embodiment of the subject application, the trace route operation is accomplished via the use of SLP communications, identifying the Internet Protocol (IP) address of each of the document processing devices 104, 114, 124, 134, 144, and 154, or the like. The relative locations of each of the document processing devices 104, 114, 124, 134, 144, and 154 with respect to the computing device 164 are then determined. In accordance with the determined relative locations, a default document processing device subset, e.g. the first subset 168 or the second subset 170, is then selected. It will be understood by those skilled in the art that the use of the subsets 168 and 170 are for example purposes only, and any number of subsets are capable of being coupled to the network 102. According to one embodiment of the subject application, the selection of a default subset 168 or 170 is accomplished via an analysis performed on the device data so as to determine the most appropriate device subset, e.g. the subset closest in location to the computing device, the subset having the most available devices, or the like. The skilled artisan will appreciate that such an analysis includes, for example and without limitation, the cross-referencing of data generated via the WINDOWS discovery process, the SNMP broadcast responses, the SLP operations, and the like.

As set forth above, the subsets 168 and 170 are each capable of including a single document processing device. Thus, a determination is made whether the selected default subset includes more than one document processing device. Upon a determination that the default subset 168 or 170 includes a single document processing device, the software driver associated with the default subset is then installed on the computing device 164. A determination is then made whether the default subset 168 or 170 is available. When available, operation of the default subset 168 or 170 is enabled via the computing device 164. When unavailable, a determination is made whether another subset is present. That is, a determination is made by the computing device 164 whether at least one additional subset is present on the network 102. When no additional subsets 168 or 170 are present, a notification is generated to the user indicating that no default document processing subset has been selected. When another subset 168 or 170 is present, a determination must be made whether the new default subset includes more than one document processing device. Operations continue thereafter as set forth above.

When the selected default subset includes more than one document processing device, a determination is then made whether or not a user associated with the computing device 164 has elected to allow the automatic selection of a default document processing device 104, 114, 124, 134, 144, or 154. Preferably, the computing device 164 employs a suitable graphical user interface enabling the associated user to interact with the identification and selection of a default document processing device 104, 114, 124, 134, 144, or 154, a subset 168, 170, enable the automatic setting of a default document processing device 104, 114, 124, 134, 144, or 154 in accordance with location data, or the like. When the user has selected automatic installation of a default document processing device 104, 114, 124, 134, 144, or 154, software drivers corresponding to each document processing device in the selected default subset are automatically installed on the computing device 164, e.g. drivers corresponding to the first subset 168 of document processing devices 104, 114, and 124, or drivers corresponding to the second subset 170 of document processing devices 134, 144, and 154 are installed on the computing device 164. For example, when the relative location of the document processing devices 104, 114, 124, 134, 144, and 154 with respect to the computing device 164 indicates that the first subset 168 is more proximate to the computing device 164 than the second subset 170, the device drivers associated with the document processing devices 104, 114, and 124 of the first subset 168 are installed on the computing device 164. Operation of the selected subset 168 is thereafter enabled via the computing device 164.

A default document processing device 104, 114, or 124 is then selected from among the default first subset 168 either automatically in accordance with the identified data paths, relative locations, or the like, or according to a user selection made via an associated graphical user interface of the computing device 164. The computing device 164, via the appropriate driver corresponding to the selected default document processing device 104, 114, or 124, then determines whether or not the default device 104, 114, or 124 is available. Preferably, the computing device 164 communicates a ping or other suitable query to the default device 104, 114, or 124 so as to ascertain whether the device 104, 114, or 124 is connected to the network 102, is available for document processing operations, and the like. When the default document processing device, for example the first document processing device 104 is available, operations of the first document processing device 104 are enabled via the computing device 164, whereupon document processing operations are capable of being performed thereby.

Upon a determination that the first default document processing device 104 is not available, unresponsive, busy, or the like, second document processing device 114 or 124 is selected from among the default subset 168 as the default document processing device. A notification message is then generated to the associated user via a suitable graphical user interface on the computing device 164 indicating the selection of the new default document processing device. Thereafter, operations of the new default document processing device 114 or 124 are enabled via the computing device 164.

When the associated user has not elected to automatically install all document processing devices 104, 114, and 124 in the default subset 168, the user is prompted to select at least one of the document processing devices 104, 114, or 124 as the default document processing device. Preferably, this selection is accomplished via interaction with a graphical user interface associated with the computing device 164. Following receipt of the default document processing device 104, 114, or 124, as selected by the user, a driver associated with the selected document processing device 104, 114, or 124 is installed on the computing device 164. A determination is then made whether the selected first default document processing device, e.g. the first document processing device 104, is available. When the first default document processing device 104 is available, i.e. accessible and ready to receive document processing operations from the computing device 164, the operations of the default document processing device 104 are enabled via the computing device 164 for operations thereon. It will be appreciated by those skilled in the art that such enablement allows the associated user to submit, via the associated data network 102, document processing jobs to the default device 104 from a suitable application, the installed driver, or the like.

In the event that the first default document processing device 104 is not available to the computing device 164, e.g., the document processing device 104 is in an error state, turned-off, busy, non-responsive, or otherwise inaccessible, the user is prompted to select a different default document processing device 114 or 124 from the default subset 168 of document processing devices 104, 114, and 124. Preferably, user selection is received by the computing device 164 via a suitable graphical user interface resident thereon. A software driver corresponding to the second default document processing device 114 or 124, depending upon which is selected by the user, is then installed on the computing device 164. A notification message is then generated to the associated user indicating that the first default document processing device 104 is not available and that a new default document processing device 114 or 124 has been set. Thereafter, operation of the default document processing device 114 or 124 is then enabled via the computing device 164.

Figure 5:
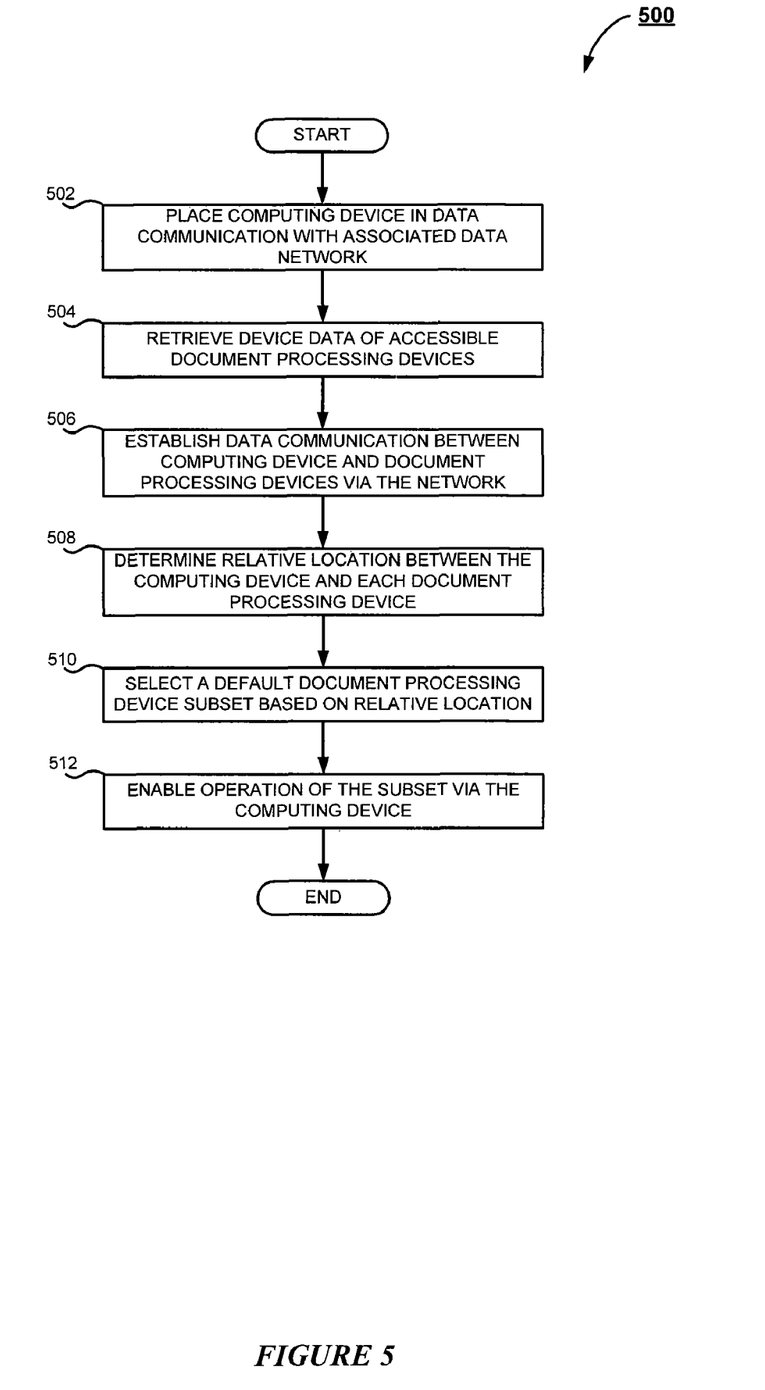
FIG. 5 is a flowchart illustrating a method for user-specific discovery and initiation of a default document processing device according to one embodiment of the subject application.

The skilled artisan will appreciate that the subject system 100 and components described above with respect to FIG. 1, FIG. 2, FIG. 3, and FIG. 4 will be better understood in conjunction with the methodologies described hereinafter with respect to FIG. 5 and FIG. 6. Turning now to FIG. 5, there is shown a flowchart 500 illustrating a method for user-specific discovery and initiation of a default document processing device in accordance with one embodiment of the subject application. Beginning at step 502, the computing device 164 is placed in data communication with an associated data network 102. Preferably, the computing device 164 is coupled to the data network 102 via a suitable communications link 166, such as a wired or wireless data link. In accordance with one embodiment of the subject application, the communications link 166 is an Ethernet connection. At step 504, device data corresponding to those document processing devices 104, 114, 124, 134, 144, and 154 accessible by the computing device 164 via the data network 102 is retrieved.

Data communication between the computing device 164 and the document processing devices 104, 114, 124, 134, 144, and 154 is then established at step 506 via the associated data network. A determination is then made at step 508 by the computing device 164 as to the relative location between the computing device 164 and each of the document processing devices 104, 114, 124, 134, 144, and 154 based upon the established data communication. At step 510, a default document processing device subset 168 or 170 is then selected in accordance with the relative location determined between the computing device and each of the available document processing devices 104, 114, 124, 134, 144, and 154. It will be appreciated by those skilled in the art that the document processing device subsets 168 and 170 are capable of including a single document processing device. Flow then progresses to step 512, whereupon operation of the document processing device subset 168 or 170 is then enabled via the computing device 164.

Figure 6:
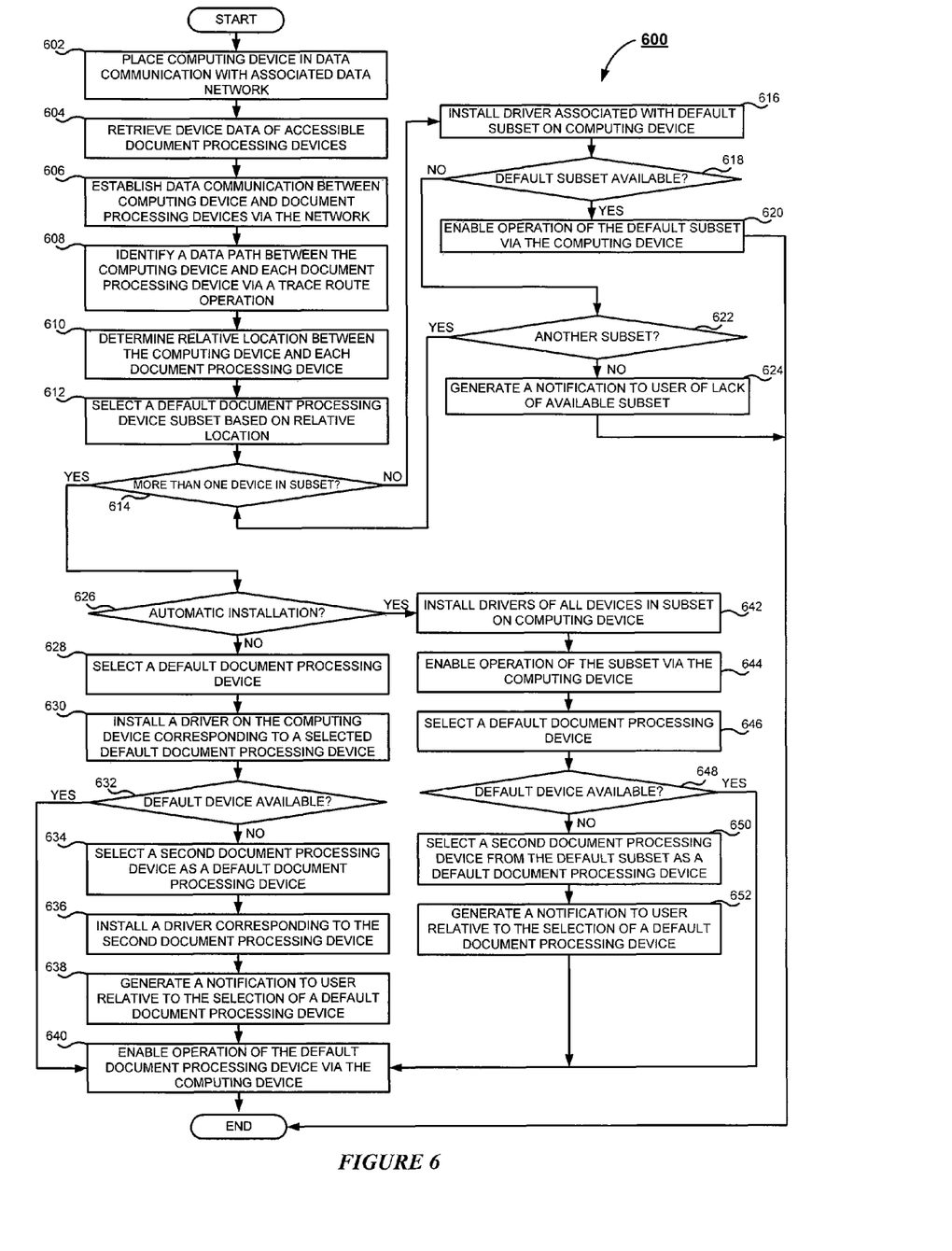
FIG. 6 is a flowchart illustrating a method for user-specific discovery and initiation of a default document processing device according to one embodiment of the subject application.

Referring now to FIG. 6, there is shown a flowchart 600 illustrating a method for user-specific discovery and initiation of a default document processing device in accordance with one embodiment of the subject application. The methodology of FIG. 6 begins at step 602, whereupon a computing device 164 is placed in data communication with an associated data network 102. The connection between the computing device 164 and the computer network 102 is accomplished via the communications link 166, preferably comprising a secure network connection, such as a wired Ethernet connection. The computing device 164, at step 604, then retrieves data corresponding to those document processing devices 104, 114, 124, 134, 144, and 154 accessible to the computing device 164 via the network 102. It will be appreciated by those skilled in the art that the computing device 164 incorporates suitable software, hardware, or a combination thereof, capable of implementing the methodology set forth in FIG. 6. Preferably, the retrieved device data includes identification data associated with each document processing device 104, 114, 124, 134, 144, and 154, associated capabilities, IP addresses, subset data, location information, or the like.

At step 606, data communication is established between the computing device 164 and each of the document processing devices 104, 114, 124, 134, 144, and 154 via the associated data network 102. A data path is then identified at step 608 between the computing device 164 and each of the document processing devices 104, 114, 124, 134, 144, and 154 based upon a trace route operation. It will be appreciated by those skilled in the art that the trace route operation is capable of being accomplished via the use of SLP communications, identifying the Internet Protocol (IP) address of each of the document processing devices 104, 114, 124, 134, 144, and 154, or the like. The computing device 164 then determines, at step 610, the relative locations of each of the document processing devices 104, 114, 124, 134, 144, and 154 with respect to the computing device 164 are then determined. The skilled artisan will appreciate that such a determination is capable of being made in accordance with the retrieved device data, e.g. the cross-referencing of device data retrieved via the WINDOWS discovery process, the SNMP broadcast responses, the SLP operations, and the like.

Based upon the relative locations determined at step 610, a default document processing subset 168 or 170 is selected at step 612. It will be understood by those skilled in the art that the use of the subsets 168 and 170 are for example purposes only, and any number of subsets are capable of being coupled to the network 102. For example, the first subset 168 is capable of corresponding to a group of document processing devices 104, 114, and 124 which are physically located on a first floor of a building and the second subset corresponds to a second group of document processing devices 134, 144, and 154 which are located on a second floor of the building, while the computing device 164 is also located on the second floor of the building. Based upon these relative locations, the default document processing subset selected is the second subset 170, as the document processing devices 134, 144, and 154 are located closer relative to the computing device 164 than those devices 104, 114, and 124 of the first subset 168. Other methods of setting the default subset 168 or 170 are capable of being implemented in accordance with the subject application and the foregoing example is not intended to limit the subject application thereto.

At step 614, a determination is made whether the selected default subset 168 or 170 includes more than one associated document processing device 114, 124, 134, 144, or 154. When it is determined that the selected default subset 168 or 170 includes more than one associated document processing device, flow proceeds directly to step 626, as discussed in greater detail below. Upon a determination at step 614 that the selected default subset 168 or 170 includes a single associated document processing device, flow proceeds to step 616. At step 616, the software driver associated with the default subset 168 or 170 is installed on the computing device 164. In accordance with one example embodiment of the subject application, the software driver is capable of being received from the default subset 168 or 170, from a portable storage medium, a library associated with the computing device 164, or the like.

Following installation of the associated software driver at step 616, a determination is made at step 618 whether the selected default subset 168 or 170 is available. When the selected default subset, e.g. the first subset 168, is available, operation of the default subset 168 is enabled at step 620 via the computing device 164, whereupon operations of the methodology of FIG. 6 terminate. When the default subset 168 is not available, a determination is made at step 622 whether another subset, e.g. the second subset 170, is available. When no additional subsets are available at step 622, flow proceeds to step 624, whereupon a notification is generated to the user indicating the lack of an available document processing subset. When another subset is available, flow returns to step 614 for a determination as to whether the additional subset, e.g. subset 170, includes more than one document processing device. For example purposes only, reference is now made to the second subset 170 as the selected default subset of document processing devices 134, 144, and 154. Continuing with such an example, a determination is then made at step 614 that the selected default subset 170 includes more than one document processing device 134, 144, and 154, whereupon operations progress to step 626.

A determination is then made at step 626 whether automatic installation of a default document processing device 134, 144, or 154 has been enabled. That is, whether a user associated with the computing device 164 has elected to have the computing device 164 automatically select a suitable default document processing device 134, 144, or 154 from the selected default subset 170. In accordance with such an embodiment of the subject application, the computing device 164 employs a suitable graphical user interface enabling the associated user to interact with the identification and selection of a default document processing device 134, 144, or 154. The skilled artisan will appreciate that the automatic installation of a default document processing device 134, 144, or 154 corresponds to the selection, retrieval, and installation of a software driver associated with the devices 134, 144, and 154.

Upon a determination at step 626 that automatic installation of a default document processing device 134, 144, or 154 has not been set by the associated user, flow proceeds to step 628, whereupon a default document processing device 134, 144, or 154 is selected from among the default subset 170. Preferably, the user is prompted via a graphical user interface associated with the computing device 164 to select at least one of the document processing devices 134, 144, and 154 of the default subset 170. Following selection of the default document processing device 104, 114, or 124 by the user, flow proceeds to step 630, whereupon a driver associated with the selected document processing device 104, 114, or 124 is installed on the computing device 164. It will be understood by those skilled in the art that the software driver is capable of being previously stored on the computing device 164, stored on the data storage device 140, 150, or 160 of the selected default document processing device 134, 144, or 154, or the like. Continuing with the example above, the default document processing device selected by the user is the document processing device 134.

A determination is then made at step 632 whether the selected first default document processing device, i.e. the document processing device 134, is available. Preferably, the computing device 164 communicates a ping or other suitable query to the default device 134 so as to ascertain whether the device 134 is connected to the network 102, is available for document processing operations, and the like. When the first default document processing device 134 is available, i.e. accessible and ready to receive document processing operations from the computing device 164, the operations of the default document processing device 134 are enabled via the computing device 164 for operations thereon. It will be appreciated by those skilled in the art that such enablement allows the associated user to submit, via the associated data network 102, document processing jobs to the default device 104 from a suitable application, the installed driver, or the like.

Upon a determination at step 632 that the first default document processing device 134 is not available, e.g., the document processing device 134 is busy, non-responsive, or otherwise inaccessible, flow proceeds to step 634, whereupon the selection of a second default document processing device 144 or 154 from the default subset 170 of document processing devices 134, 144, and 154 is made. In accordance with one embodiment of the subject application, user selection is received by the computing device 164 via a suitable graphical user interface resident thereon. At step 636, the software driver corresponding to the second default document processing device 144 or 154 is then installed on the computing device 170. Flow then progresses to step 638, whereupon a notification message is generated to inform the associated user that the first default document processing device 134 is not available and that a new default document processing device 144 or 154 has been selected. Thereafter, operation of the default document processing device 144 or 154 is then enabled via the computing device 164 at step 640.

Returning to step 626, when it is determined that automatic installation has been selected by the associated user, flow proceeds to step 642. At step 642, software drivers corresponding to each of the document processing devices 134, 144, and 154 of the selected default subset 170 are installed on the computing device 164. At step 644, operation of the selected subset 170 is enabled via the computing device 164.

Flow then proceeds to step 646, whereupon a default document processing device 134, 144, or 154 is automatically selected from among the default subset 170 in accordance with the identified data paths, relative locations, or the like. In accordance with an alternate embodiment, the user is capable of selecting the default document processing device 134, 144, or 154 via a suitable graphical user interface of the computing device 164. Flow then proceeds from step 646 to step 648, whereupon a determination is made by the computing device 164, via the appropriate driver corresponding to the selected default document processing device, e.g. the document processing device 134, whether the default device 134 is available. When the default document processing device 134 is available, flow proceeds to step 640, whereupon operations of the first default document processing device 134 are enabled via the computing device 164, whereupon document processing operations are capable of being performed thereby.

Upon a determination at step 648 that the first default document processing device 134 is not available, unresponsive, busy, or the like, a second default document processing device 144 or 154 is selected at step 650 from among the default subset 170 as the default document processing device. At step 652, a notification message is then generated indicating the selection of the new default document processing device, e.g. the document processing device 144, to the associated user via a suitable graphical user interface on the computing device 164. Operations then proceed to step 640, whereupon operations of the new default document processing device 144 are enabled via the computing device 164.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for user-specific discovery and initiation of a default document processing device comprising:
    means adapted for placing a computing device in data communication with an associated data network;
    means adapted for retrieving device data corresponding to a plurality of document processing devices accessible by the computing device;
    means adapted for establishing data communication between the computing device and the plurality of document processing devices via the associated data network;
    locating means adapted for determining a relative location between the computing device and each of the plurality of document processing devices in accordance with established data communication;
    selection means adapted for selecting a default document processing device subset from the plurality thereof in accordance with an output of the locating means; and
    enabling means adapted for enabling operation of the document processing device subset via the computing device.

2. The system of claim 1 wherein the selection means includes means adapted for selecting the default document processing device subset as being that local to a location of the computing device.

3. The system of claim 2 wherein the locating means includes means adapted for determining relative location in accordance with a trace route operation identifying a data path between the computing device and each of the plurality of document processing devices.

4. The system of claim 3 wherein:
    the selection means includes means adapted for selecting the default document processing device subset inclusive of a default document processing device; and the system further includes means adapted for installing a driver in the computing device corresponding to a selected default document processing device.

5. The system of claim 4 further comprising:
testing means adapted for determining availability of the default document processing device;
means adapted for selecting a second document processing device as the default document processing device in accordance with an output of the testing means; and
means adapted for installing a driver in the computing device corresponding to the second document processing device.

6. The system of claim 5 further comprising notification means adapted for generating a notification to an associated user relative to selection of a default document processing device.

7. A method for user-specific discovery and initiation of a default document processing device comprising the steps of:
placing a computing device in data communication with an associated data network;
retrieving device data corresponding to a plurality of document processing devices accessible by the computing device;
establishing data communication between the computing device and the plurality of document processing devices via the associated data network;
determining a relative location between the computing device and each of the plurality of document processing devices in accordance with established data communication;
selecting a default document processing device subset from the plurality thereof in accordance with an output of the determining step; and
enabling operation of the document processing device subset via the computing device.

8. The method of claim 7 wherein the step of selecting selects the default document processing device subset as being that local to a location of the computing device.

9. The method of claim 8 wherein the step of determining relative location is in accordance with a trace route operation identifying a data path between the computing device and each of the plurality of document processing devices.

10. The method of claim 9 wherein:
the selection of the default document processing device subset is inclusive of a default document processing device; and
the method further includes the step of installing a driver in the computing device corresponding to a selected default document processing device.

11. The method of claim 10 further comprising the steps of:
determining availability of the default document processing device;
selecting a second document processing device as the default document processing device in accordance with an output of the determining step; and
installing a driver in the computing device corresponding to the second document processing device.

12. The method of claim 11 further comprising the step of generating a notification to an associated user relative to selection of a default document processing device.

* * * * *